United States Patent [19]

Yamamoto et al.

[11] Patent Number: 5,084,288
[45] Date of Patent: Jan. 28, 1992

[54] PREMIX FOR COOKING BY A MICROWAVE OVEN AND PROCESS OF PREPARATION THEREOF

[75] Inventors: Masanori Yamamoto, Osaka; Yuji Kunimoto, Hyogo; Takako Kubo, Nara, all of Japan

[73] Assignee: House Food Industrial Company Limited, Higashiosaka, Japan

[21] Appl. No.: 318,500

[22] Filed: Mar. 3, 1989

Related U.S. Application Data

[63] Continuation of Ser. No. 921,265, Oct. 21, 1986, abandoned.

[30] Foreign Application Priority Data

Oct. 22, 1985 [JP] Japan ............................ 60-236077
Oct. 22, 1985 [JP] Japan ............................ 60-236078
Oct. 22, 1985 [JP] Japan ............................ 60-236079
Oct. 22, 1985 [JP] Japan ............................ 60-236080

[51] Int. Cl.$^5$ ..................... A21D 10/00; A23L 1/00
[52] U.S. Cl. ..................... 426/107; 426/111; 426/113; 426/128; 426/234; 426/243; 426/554; 426/555
[58] Field of Search ............. 426/107, 113, 128, 243, 426/111, 234, 555, 554

[56] References Cited

U.S. PATENT DOCUMENTS

| | | |
|---|---|---|
| 2,525,599 | 10/1950 | Gustavson ........................ 426/554 |
| 3,170,796 | 2/1965 | Andre et al. ..................... 426/554 |
| 3,275,451 | 9/1966 | Holstein ........................... 426/552 |
| 3,508,928 | 4/1970 | Ewing et al. ..................... 426/554 |
| 3,973,045 | 8/1976 | Brandberg et al. .............. 426/111 |
| 4,036,423 | 7/1977 | Gordon ............................. 426/111 |
| 4,038,425 | 7/1977 | Brandberg et al. .............. 426/111 |
| 4,120,984 | 10/1978 | Richardson et al. ............ 426/128 |
| 4,350,713 | 9/1982 | Dyson et al. ..................... 426/552 |
| 4,396,635 | 8/1983 | Roudebush et al. ............. 426/243 |
| 4,571,340 | 2/1986 | Ferrante et al. ................. 426/111 |
| 4,594,492 | 6/1986 | Maroszek ......................... 426/113 |

FOREIGN PATENT DOCUMENTS 417300 10/1934 United Kingdom .
1110711 4/1968 United Kingdom .
2009583 6/1979 United Kingdom .

OTHER PUBLICATIONS

Japanese Kokai 56-1839, 10/01/81.

Primary Examiner—Donald E. Czaja
Assistant Examiner—Mary S. Mims
Attorney, Agent, or Firm—Oblon, Spivak, McClelland, Maier & Neustadt

[57] ABSTRACT

A novel premix for cooking by a microwave oven comprising flour, sugar, baking powder and emulsifier, characterized in that the moisture content of the flour ranges from 1.0 to 9.5 weight %. The premix has good storage property. Namely, deterioration of oils, color and taste are not observed and caking and gas generation do not occur.

15 Claims, No Drawings

PREMIX FOR COOKING BY A MICROWAVE OVEN AND PROCESS OF PREPARATION THEREOF

This application is a continuation of application Ser. No. 921,265, filed on Oct. 21, 1986, now abandoned.

BACKGROUND OF THE INVENTION (1) Field of the Invention

This invention relates to a premix used for preparing a cake, a steamed cake or the like, and more particularly to a premix which can be stored for a long period and from which a cake or the like can be prepared by using a household microwave oven.

(2) Description of the Prior Art

Many kinds of premixes having various compositions have been known for preparing cakes, steamed cakes and the like.

However, these conventional premixes have the following disadvantages:

(1) Caking occurs during storage of the premix and gas is produced from the baking powder contained in the mix.
(2) Oils in the premix deteriorate during storage, giving rise to a bad smell and color as well as to a bad taste.
(3) When raw flour is used, an insecticide step such as treatment by an egg crack machine is required for killing eggs of insects contained in the flour.

Moreover, the compositions of conventional premixes are selected to be suitable for preparation by using an oven. On the other hand, the microwave oven has recently enjoyed rapid popularity for home use and has become an important piece of equipment replacing the oven because of its convenience and safety.

However, cakes, steamed cakes or the like prepared from a premix having conventional composition using a microwave oven has the following disadvantages:

(a) A cake or the like having good texture cannot be obtained. Some cakes and the like tend to rise too much and acquire a crumbly texture while the others become dry and crumbly.
(b) An appropriately sweet and moist cake or the like cannot be obtained.
(c) As regards a premix containing solid pieces, the pieces do not disperse uniformly in the cake but collect near bottom of the cake, so that these pieces do not enhance the attractiveness of the cake.

These disadvantages result from the fact that the cake cooked by the heating action of microwaves generated in the microwave oven in a manner that is quite different from that in conventional ovens.

SUMMARY OF THE INVENTION

An object of this invention is therefor to provide a premix having good storage properties.

Another object of this invention is to provide a premix from which it is possible to make an appropriately sweet and moist cake or the like, namely one which has proper moisture retention, is soft, spongy and elastic, has a fine texture and rises properly.

This invention relates to a premix for cooking by a microwave oven comprising flour, sugar, baking powder and emulsifier, characterized in that the moisture content of the flour ranges from 1.0 to 9.5 weight %.

DETAILED DESCRIPTION OF THE INVENTION

The present invention is illustrated in detail as follows:

The premix of this invention comprises flour, sugar, baking powder, emulsifier and the like. The premix of this invention may further comprise sorbitol, powdered albumen, powdered milk, salt and edible fats and oils. It may also comprise additives such as spices.

In this invention, the flour contained in the premix contains about 1.0 to 9.5 weight % moisture, preferably about 3 to 7.5 weight % moisture. By using a flour having 9.5 weight % or less moisture content, good properties (such as taste, color and caking) can be maintained stably. Further, by keeping the moisture content at 1.0 weight % or more, the cost of drying can be minimized and dust explosion prevented.

The flour having the above moisture content range may be prepared easily by drying commercially available flour having a moisture content of about 14 weight % by conventional methods (such as atmospheric pressure drying or drying under reduced pressure). Pheumatic conveying drying is particularly preferred.

In this invention, the content of baking powder in the premix ranges from 1.0 to 4.5 weight %, preferably from 1.5 to 4 weight %. The content of emulsifier in the premix of this invention ranges from 0.3 to 3 weight %, preferably from 0.8 to 1.2 weight %. If the content of baking powder is less than 1.0 weight %, good rising cannot obtain and the obtained cake is dry and crumbly. If the content of baking powder is more than 4.5 weight %, the obtained cake rises too much and the texture of the cake is weak. Further, if the content of the emulsifier is less than 0.3 weight %, the cake obtained is hard and difficult to swallow. If the content thereof is more than 3 weight %, the cake obtained smells of emulsifier. A cake, a steamed cake or the like, which is moist and fine, which has a soft and spongy texture, and which rises properly and has good moisture retention, can be obtained by controlling the contents of baking powder and emulsifier in the above prescribed ranges.

Examples of the baking powder used in this invention include one which comprises sodium bicarbonate and acid and is commercially available. Examples of the acid include gluconodelta-lactone, tertaric acid, phosphate and the like. Examples of the emulsifier include sugar ester, sorbitan fatty acid ester, glyceride and the like but the acid used is not limited to these examples.

In the present invention, the content of sorbitol in the premix range from 7 to 30 weight %, preferably from 8 to 15 weight % and the content of emulsifier ranges from 0.3 to 3 weight %, preferably from 0.8 to 2.0 weight %. If the content of sorbitol is less than 7 weight %, the obtained cake is not sweet and moist enough. On the other hand, if the content is more than 30 weight %, the cake is too sweet and too moist. Further, if the content of the emulsifier is less than 0.3 weight %, the cake obtained is hard and hard to swallow. If the content thereof is more than 3 weight %, the cake obtained smells of emulsifier. A cake, a steamed cake or the like, which is appropriately moist, soft, elastic and sweet and which has proper moisture retention, can be obtained by controlling the contents of sorbitol and emulsifier in the above prescribed ranges.

The maximum particle size of solid pieces contained in the premix of the present invention should be 4000 micrometer or less, preferably 1400 to 3500 micrometer, and the specific gravity thereof should be 1.1 or less, preferably 1.05 or less. Examples of usable solid pieces include dried fruits, vegetable flakes, sliced nuts and the like. The solid pieces may be prepared by a method such as freeze-drying, oil-frying, hot-air drying, drum drying or the like so as to control the specific gravity thereof. The freeze-dry method is preferred because it facilitates the preservation of qualities such as taste, texture and the like.

The mixing ratio of the respective constituents other than the constituents described above in the premix of the present invention are, for example, about 35 to 55 weight % flour, 20 to 40 weight % sugar, about 1.5 to 3.5 weight % powdered albumen, about 1 to 9 weight % powdered milk, about 4 to 18 weight % edible fats and oils, about 0.1 to 0.7 weight % salt and about 1 to 10 weight % solid pieces.

The premix of the present invention can be prepared by, for example, the following process.

Baking powder, emulsifier, powdered albumen and powdered milk are premixed and the resulting mixture is mixed with dried flour having a moisture content of 1.0 to 9.5 weight %, sugar and sorbitol. Then edible fats and oils are added to and dispersed in the thus obtained mixture. Whereupon the premix of the present invention is obtained.

The resulting premix of the present invention is charged in a package such as a polypropylene laminate bag and the package is sealed. The premix of this invention is characterized by having improved packing properties such as flowability in comparison with the conventional premix and can be packed easily.

A cake, a steamed cake or the like can be obtained by thoroughly mixing the premix of the present invention with water in a suitable container and heating them in a microwave oven.

Further, in the present invention, it is preferred that the premix which contains from 1.0 to 4.5 weight % of baking powder and from 0.3 to 3 weight % of emulsifier be packed in a package in the ratio of premix weight to package volume (g/ml) of from 0.15:1 to 0.32:1.

If the ratio of premix weight to package volume is less than 0.15:1, the resulting cake is small and looks poor and the top cannot be molded by the upper part of the package. On the other hand, if the above ratio is more than 0.32:1, the premix in the package boils over from an opening of a lid of the package when it is heated in a microwave oven, or the resulting cake or the like cannot separate easily from the lid because it adheres to the lid. The thus obtained cake looks poor.

Moreover, from the viewpoint of moldability and the like, it is preferred that the package used in the present invention have a ratio of package height (cm) to bottom area of the package (cm²) in the range of from 0.08:1 to 0.35:1. The materials of the package are not limited, but paper, plastic and composites thereof are preferred because they are easily available.

This invention will be illustrated more in detail with reference to the following EXAMPLES.

EXAMPLE 1

150 g of premix having the following composition was charged in a polypropylene laminate bag (stretched polypropylene/aluminum vapor deposit/non-stretched polypropylene) and stored in a thermostated vessel at 40° C. for 16 weeks. After 16 weeks storage, no caking or gas production were observed.

| Premix composition | |
| --- | --- |
| Flour (moisture: 7.5%) | 40% |
| Sugar | 35% |
| Powdered albumen | 2.5% |
| Baking powder | 2% |
| Powdered milk | 3% |
| Emulsifier | 1% |
| Salt | 0.3% |
| Edible fats and oils | 16.2% |

The premix stored for 16 weeks was mixed with 100 ml water and agitated thoroughly, followed by heating in a microwave oven (500 W) for 4 minutes, whereupon a cake was obtained. The color and taste of the resulting cake were equivalent to those of a cake prepared from a fresh premix.

Process for preparing a premix

Flour was dried in an airborne dryer to 7.5% of moisture content and the dried flour was packed to protect it from absorbing moisture. Powdered albumen, 2.5 parts by weight, baking powder, 2 parts by weight, powdered milk, 3 parts by weight, emulsifier, 1 part by weight, and salt, 0.3 parts by weight, were premixed to obtain a raw material powder. 8.8 parts by weight of the resulting powder, 40 parts by weight of the dried flour and 35 parts by weight of sugar were mixed in a mixer at about 80 rpm for about 1 minute to obtain uniform powder mixture. Then the powder mixture was slowly added with 16.2 parts by weight of edible fats and oils while agitating the mixture. The mixture was agitated for about 5 minutes to obtain uniform powder, namely a premix of the present invention. The thus obtained premix was charged in a package such as a polypropylene laminate bag or the like and the package was sealed to prevent the premix from absorbing moisture.

REFERENCE EXAMPLE 1

In accordance with the procedure of EXAMPLE 1 but using flour with 13.7% of moisture content, storage test, color test and the like were carried out. After storage for 1 week, caking and gas generation were observed. The cake prepared from the premix stored for 16 weeks had poor color and taste.

EXAMPLE 2

150 g of a premix having the following composition was charged in a package (volume: 0.7 l, bottom area: 100 cm², height: 7 cm).

| Premix composition | |
| --- | --- |
| Flour (moisture: 7.5%) | 40% |
| Sugar | 35% |
| Powdered albumen | 2.5% |
| Baking powder | 2% |
| Powdered milk | 3% |
| Emulsifier | 1% |
| Salt | 0.3% |
| Edible fats and oils | 16.2% |

Then said premix was added with 100 ml water and agitated thoroughly, followed by heating in a microwave oven (500 W) for 4 minutes. A cake which was moist and soft, had a fine and spongy texture, exhibited good moisture retention, and which had risen properly was obtained. The volume of the resulting cake was 95% of that of the package.

EXAMPLE 3

122 g a premix having the following formula composition was charged in a package (volume: 0.6l, bottom area 100 cm², height: 6 cm)

| Premix composition | |
| --- | --- |
| Flour (moisture: 6.0%) | 49% |
| Sugar | 40% |
| Powdered albumen | 2% |
| Baking powder | 1% |
| Powdered milk | 2.7% |
| Emulsifier | 1% |
| Salt | 0.3% |
| Edible fats and oils | 4% |

Then the premix was added with water 100 ml and agitated thoroughly, followed by heating in a microwave oven (500 W) for 4 minutes. A steamed cake which was moist and soft, had a fine and spongy texture, exhibited good moisture retention, and which had risen properly was obtained. The volume of the resulting cake was 95% of that of the package.

EXAMPLE 4

122 g a premix having the following composition was charged in a package.

| Premix composition | |
| --- | --- |
| Flour (moisture: 4.5%) | 54% |
| Sugar | 31% |
| Powdered albumen | 2.2% |
| Baking powder | 3.5% |
| Powdered milk | 4% |
| Emulsifier | 1% |
| Salt | 0.3% |
| Edible fats and oils | 4% |

Then the premix was added with water 100 ml and agitated thoroughly, followed by heating in a microwave oven (500 W) for 4 minutes. A steamed cake which was properly soft, moist, sweet and elastic and which had good moisture retention, was obtained. After 1 hour, the cake still maintained its original shape.

EXAMPLE 5

150 g a premix having the following composition was charged in a package. The premix was added with water 100 ml and agitated thoroughly, followed by heating in a microwave oven (500 W) for 4 minutes.

| Premix composition | |
| --- | --- |
| Flour (moisture: 4.0%) | 40% |
| Sugar | 35% |
| Powdered albumen | 2.5% |
| Baking powder | 2% |
| Powdered milk | 3% |
| Emulsifier | 1% |
| Salt | 0.3% |
| Edible fats and oils | 14.8% |
| Solid pieces (freeze-dried sacrocarp paste (strawberry, melon and orange) Particle size: 2000-3500 micrometer Specific gravity: 0.45) | 1.4% |

The solid pieces were dispersed in the cake and the cake had a fine appearance.

REFERENCE EXAMPLE 2

A cake was prepared in accordance with the procedure of EXAMPLE 5 but using a mixture (particle size: about 5 mm square) of cherry immersed in syrup (specific gravity: 1.25), angelica (specific gravity: 1.2) and orange peel (specific gravity: 1.2), in place of freeze-dried sarcocarp paste. The solid pieces setted to the bottom of the thus obtained cake, giving the cake a poor appearance.

ADVANTAGES OF THE INVENTION

The premix of the present invention has the following advantages:

(1) The premix has good storage property. Namely deterioration of oils, color and taste are not observed and caking and gas generation do not occur.

(2) Charging into packages such as bags is easy.

(3) The flour is dried (heated) and therefor no insecticide step is required.

(4) Cakes, steamed cakes or the like which are moist and soft, have a fine and spongy texture, exhibit good moisture retention, and rise properly can easily be prepared by, for example, a child by using a microwave oven.

(5) The premix in a package does not boil over from an opening of a lid of the package when it is heated in a microwave oven and the premix boiled over does not soil in the microwave oven. The resulting cake or the like can separate easily from the lid because it does not adhere to the lid. The cake or the like can be molded by the upper part of the package (lid), that is, can be molded in the desired shape and the obtained cake looks fine.

(6) Cakes, steamed cakes or the like which are properly moist, soft and elastic and exhibit good moisture retention can easily be prepared by, for example, a child by using a microwave oven.

(7) Cakes and the like in which solid pieces are dispersed and which have a fine appearance can be prepared from the premix of the present invention by using a microwave oven.

We claim:

1. A packaged premix for cooking by a microwave oven consisting essentially of flour, sugar, baking powder and edible emulsifier wherein the water content of the flour ranges from 1.0 to 9.5 weight %, the content of the baking powder ranges from 1.0 to 4.5 weight % based on the premix weight, the content of the edible emulsifier ranges from 0.3 to 3 weight % based on the premix weight and the premix is packed in a microwave compatible package having a lid means such that the ratio of the premix weight to the package volume ranges from 0.15 g/ml to 0.32 g/ml, wherein when heated in a microwave oven, the premix does not boil out of said package and wherein the cake produced by said premix after heating in said oven is molded by said lid means.

2. The premix of claim 1 wherein the water content of the flour ranges from 3 to 7.5 weight %.

3. The premix of claim 1 wherein the baking powder comprises sodium bicarbonate and at least one member selected from the group consisting from tartaric acid, phosphoric acid and gluconodelta-lactone.

4. The premix of claim 1 wherein the edible emulsifier is at least one member selected from the group consisting of sugar ester, sorbitan fatty acid ester and glyceride.

5. The premix of claim 1 wherein the package has a bottom and the ratio of the package height (cm) to the bottom area of the package (cm²) ranges from 0.02:1 to 0.35:1.

6. The premix of claim 1 wherein the package is made from at least one member selected from the group consisting of paper, plastic and composite of paper and plastic.

7. A packaged premix for cooking by a microwave oven consisting essentially of flour, sugar, baking powder and edible emulsifier wherein the water content of the flour ranges from 1.0 to 9.5 weight %, the content of the baking powder ranges from 1.0 to 4.5 weight % based on the premix weight, the content of the edible emulsifier ranges from 0.3 to 3 weight % based on the premix weight and the premix is packed in a microwave compatible package having a lid means such that the ratio of the premix weight to the package volume ranges from 0.15 g/ml to 0.32 g/ml, wherein when heated in a microwave oven, the premix does not boil out of said package and wherein the cake produced by said premix after heating in said oven is molded by said lid means, wherein the premix further comprises powdered albumin, powdered milk, edible fats, edible oils and edible salt.

8. A packaged premix for cooking by a microwave oven consisting essentially of flour, sugar, baking powder and edible emulsifier wherein the water content of the flour ranges from 1.0 to 9.5 weight %, the content of the baking powder ranges from 1.0 to 4.5 weight % based on the premix weight, the content of the edible emulsifier ranges from 0.3 to 3 weight % based on the premix weight and the premix is packed in a microwave compatible package having a lid means such that the ratio of the premix weight to the package volume ranges from 0.15 g/ml to 0.32 g/ml, wherein when heated in a microwave oven, the premix does not boil out of said package and wherein the cake produced by said premix after heating in said oven is molded by said lid means, wherein the premix further comprises powdered albumin, powdered mile, edible fats, edible oils, edible salt and sorbitan.

9. The premix of claim 8 wherein the content of the sorbitan ranges from 7 to 30 weight % based on the weight of the premix.

10. A packaged premix for cooking by a microwave oven consisting essentially of flour, sugar, baking powder and edible emulsifier wherein the water content of the flour ranges from 1.0 to 9.5 weight %, the content of the baking powder ranges from 1.0 to 4.5 weight % based on the premix weight, the content of the edible emulsifier ranges from 0.3 to 3 weight % based on the premix weight and the premix is packed in a microwave compatible package having a lid means such that the ratio of the premix weight to the package volume ranges from 0.15 g/ml to 0.32 g/ml, wherein when heated in a microwave oven, the premix does not boil out of said package and wherein the cake produced by said premix after heating in said oven is molded by said lid means, wherein the premix further comprises edible solid pieces having a maximum particle size of 4000 micrometer or less and a specific weight of 1.1 or less.

11. The premix of claim 10 wherein the edible solid pieces are at least one member selected from the group consisting of dried fruit, vegetable flakes and sliced nuts.

12. A process for preparing a packaged premix by cooking in a microwave, said premix consisting essentially of flour, sugar, baking powder and edible emulsifier wherein the water content of the flour ranges from 1.9 to 9.5 weight %, the content of the baking powder ranges from 1.0 to 4.5 weight % based on the premix weight and the content of the edible emulsifier ranges from 0.3 to 3 weight % based on the premix weight and the premix is packed in a microwave compatible package having a lid means such that the ratio of the premix weight to the package volume ranges from 0.15 g/ml to 0.32 g/ml, which comprises the steps:

(a) drying flour to a water content in the range of from 1.0 to 9.5 weight %;

(b) mixing the flour obtained in the step (a) with baking powder, edible emulsifier and sugar; and (c) charging the obtained mixture in a package, wherein when heated in a microwave oven with water, the premix does not boil out of said package and wherein the cake produced by said premix after heating in said oven is molded by said lid means.

13. The process of claim 12 wherein the flour is dried to a water content in the range of from 3 to 9.5 weight %.

14. A process for preparing a packaged premix by cooking in a microwave, said premix consisting essentially of flour, sugar, baking powder and edible emulsifier wherein the water content of the flour ranges from 1.9 to 9.5 weight %, the content of the baking powder ranges from 1.0 to 4.5 weight % based on the premix weight and the content of the edible emulsifier ranges from 0.3 to 3 weight % based on the premix weight and the premix is packed in a microwave compatible package having a lid means such that the ratio of the premix weight to the package volume ranges from 0.15 g/ml to 0.32 g/ml, which comprises the steps:

(a) drying flour to a water content in the range of from 1.0 to 9.5 weight %;

(b) mixing the flour obtained in the step (a) with baking powder, edible emulsifier, albumin, powdered milk and sugar; and (c) charging the obtained mixture in a package, wherein when heated in a microwave oven with water, the premix does not boil out of said package and wherein the cake produced by said premix after heating in said oven is molded by said lid means.

15. A process for preparing a packaged premix by cooking in a microwave, said premix consisting essentially of flour, sugar, baking powder and edible emulsifier wherein the water content of the flour ranges from 1.9 to 9.5 weight %, the content of the baking powder ranges from 1.0 to 4.5 weight % based on the premix weight and the content of the edible emulsifier ranges from 0.3 to 3 weight % based on the premix weight and the premix is packed in a microwave compatible package having a lid means such that the ratio of the premix weight to the package volume ranges from 0.15 g/ml to 0.32 g/ml, which comprises the steps:

(a) drying flour to a water content in the range of from 1.0 to 9.5 weight %;

(b) mixing the flour obtained in the step (a) with baking powder, edible emulsifier and sugar; adding edible fats and edible oils to the mixture so obtained and dispersing said fats and oils in said mixture; and (c) charging the obtained mixture in a package, wherein when heated in a microwave oven with water, the premix does not boil out of said package and wherein the cake produced by said premix after heating in said oven is molded by said lid means.

* * * * *